Figure 1:
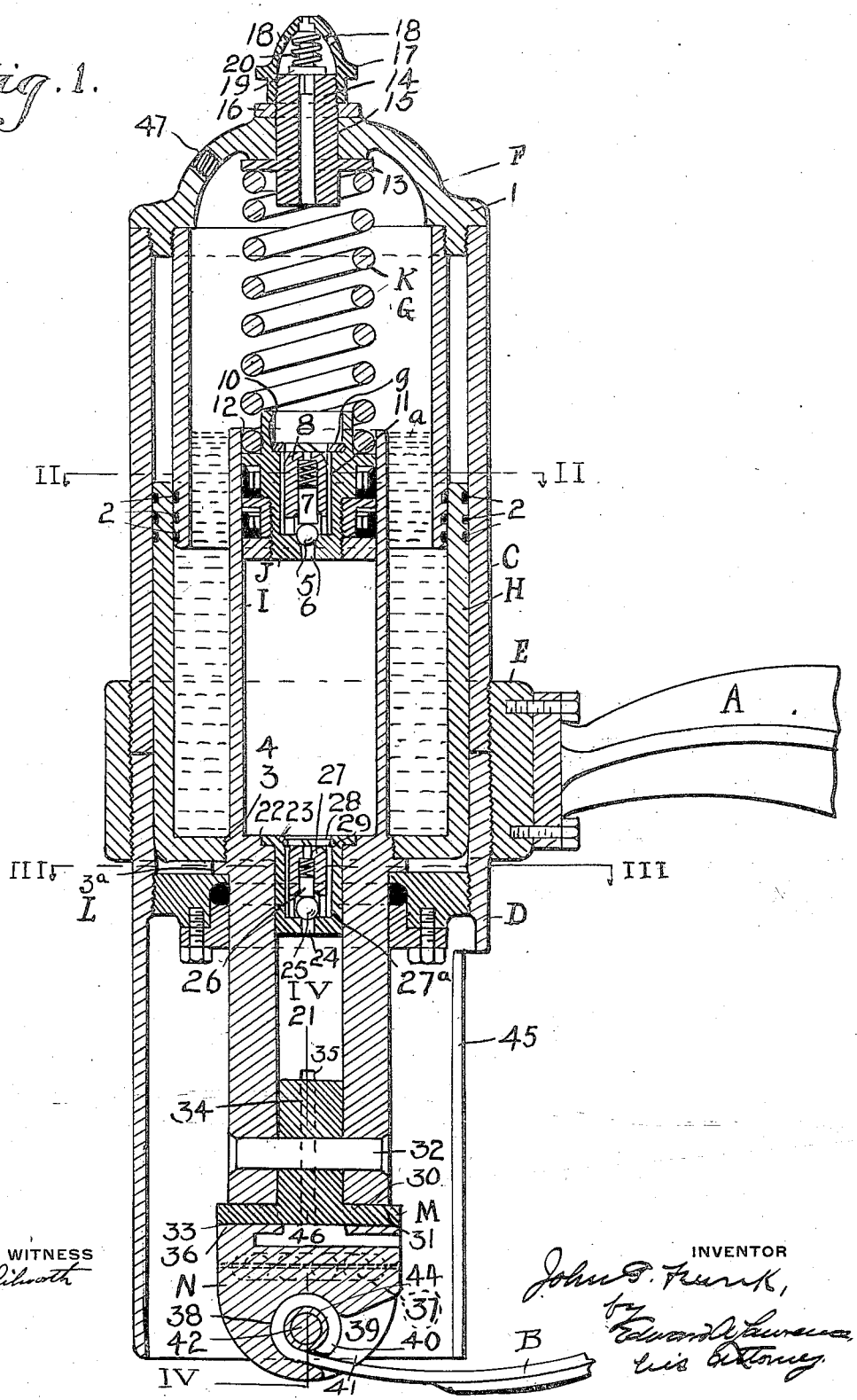

J. G. FUNK.
AIR SPRING.
APPLICATION FILED DEC. 28, 1915.

1,200,446.

Patented Oct. 3, 1916.
2 SHEETS—SHEET 1.

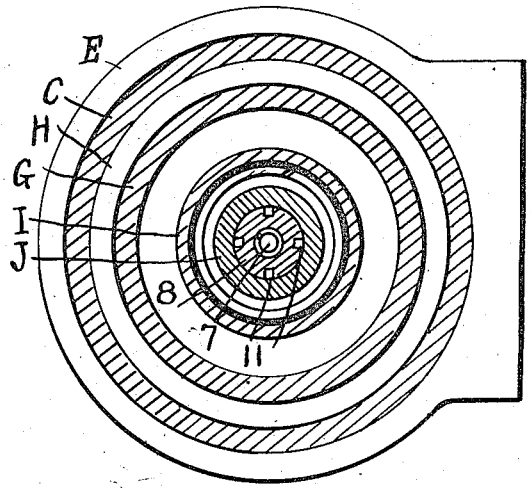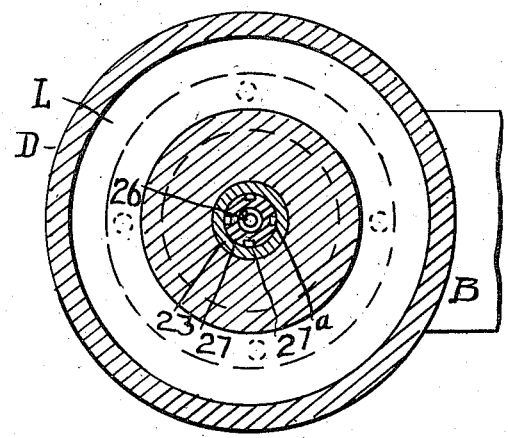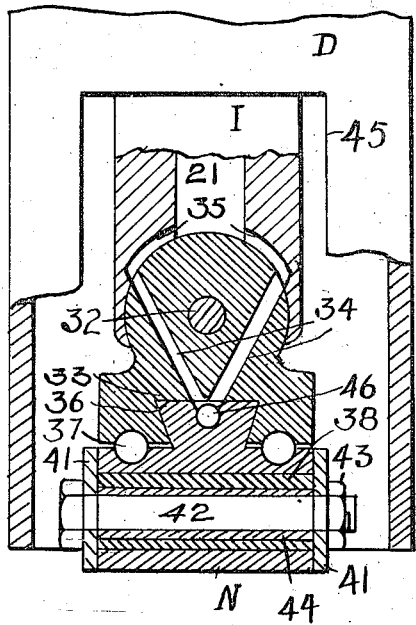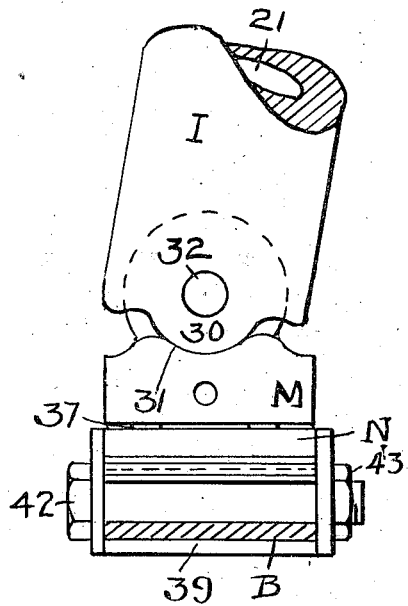

UNITED STATES PATENT OFFICE.

JOHN G. FUNK, OF SWISSVALE, PENNSYLVANIA, ASSIGNOR TO THE JOHN G. FUNK AIR SPRING COMPANY, OF PITTSBURGH, PENNSYLVANIA, A CORPORATION OF DELAWARE.

AIR-SPRING.

1,200,446.

Specification of Letters Patent.

Patented Oct. 3, 1916.

Application filed December 28, 1915. Serial No. 68,981.

*To all whom it may concern:*

Be it known that I, JOHN G. FUNK, a citizen of the United States, and residing in the borough of Swissvale, in the county of Allegheny and State of Pennsylvania, have invented or discovered new and useful Improvements in Air-Springs, of which the following is a specification.

My invention consists of a new and improved air-spring or cushion device intended for use either as a substitute for or in connection with the usual resilient metallic springs of a vehicle, such as an automobile; four of my air-springs being usually provided for each vehicle, two for each axle.

Generally speaking, my air-spring comprises a pair of telescopic elements, such as cylinders, one element being connected to one portion of the vehicle, such as the frame, while the other element is connected to another portion of the vehicle, such as a leaf spring; an air-pumping chamber mounted on one of the elements and provided with a valved opening to atmosphere, and a piston, provided with a valved opening into the interior of the air-spring proper, working in said air-pumping chamber and connected by means of a spring with the other element. An adjustable automatic relief valve is provided so that the internal pressure of the air-spring may be maintained at that required to cushion the load.

New and improved means are provided for mounting the air-spring in position whereby the torsional and other thrusts, set up by the travel of the vehicle, are prevented from racking and damaging the air-spring and impairing its efficient operation.

Other novel features of construction and arrangement of parts will appear from the following description.

In the accompanying drawings, which are merely intended to illustrate the principles of my invention but not to limit the scope of the same to the construction shown, Figure 1 is a vertical section of my improved air-spring interposed between the frame and the leaf spring of a vehicle; Fig. 2 is a sectional view of the same taken along the line II—II in Fig. 1; Fig. 3 is a similar view along the line III—III in Fig. 1; Fig. 4 is a broken elevation of the lower end of the air spring, the piston rod and its connection with the leaf-spring of the vehicle being shown in section along the line IV—IV in Fig. 1 and Fig. 5 is a broken elevation of the lower end of the piston rod and its connections showing the former swung out of its normal relation to the leaf spring.

The following is a detailed description of the drawings.

A represents a portion of the vehicle frame, and B one of the leaf springs.

C and D represent a pair of abutting and alined cylindrical sleeves coupled together by means of the internally threaded ring E which is bolted or otherwise secured to the frame A. If desired, the sleeves C and D may be integral but for convenience in assembling, I prefer the two sleeves connected together as shown.

F is a cap provided with an annular flange 1 both externally and internally threaded, as shown. The upper or outer end of the sleeve C is internally threaded and screwed on the external threads of said flange.

G is a cylinder whose upper end is externally threaded and screwed into the internal threads of the flange 1. The cylinder G thus extends within the sleeve C and is spaced within the same the thickness of the flange 1.

H is the outer cylinder whose open or upper end reciprocates in the annular space between the said inner cylinder G and the sleeve C, packing rings 2 being provided on the exteriors of both cylinders to prevent the escape of pressure from the interior of the air-spring. The head or outer end of the cylinder H is solid except for a central threaded aperture 3.

I is a piston rod which extends inwardly through the head of cylinder H and is provided with a threaded portion intermediate of its length which is screwed into the threads of the aperture 3, as shown. Said piston rod is also provided with a circumferential collar 3ª which, when the piston rod is installed bears against the exterior face of the head of cylinder H. Thus the piston rod I and the cylinder H are rigidly connected and move in unison. The piston I is hollow and within the cylinder H is bored out to form an open top air-pumping chamber 4 in which moves a piston J provided with an upwardly opening air valve 5. Said valve is preferably a ball valve held normally seated in the upper end of the air passage 6 by means of a spring actuated plunger 7 mounted in the nipple 8 which is held seated in the axial bore of the piston J by means of a split spring ring 9 seated in an annular groove 10 in said bore. 11 are vertical air passages cut in the perimeter of said nipple 8 for the upward escape of air from the air-pumping chamber 4 when the valve 5 is open. The piston is provided with suitable packing rings as shown.

K is a relatively heavy helical spring whose lower end is mounted in an annular shoulder 12 on the piston J and whose upper end is seated against an annular flange 13 on a bushing 14, which bushing depends through an axial hole 15 in the cap F. The outer end of said bushing is externally threaded to receive the clamping nut 16 whereby said bushing is rigidly locked in place with the flange 13 drawn snugly against the inner face of the cap F.

17 is a dome shaped cage mounted on the external threaded end of bushing 14 and provided with ports 18 in its wall.

19 is a puppet valve, having its lower stem squared and depending in the bushing 14, normally held in place to close the bore of said bushing by means of a helical spring 20 coiled about the upper stem of said valve 19 and bearing at its ends against said valve and against the cage 17, as shown. It is evident that by tightening or loosening the cage 17 on the bushing 14, the tension of the spring 20 may be regulated to permit the valve 19 to open automatically at any predetermined pressure in the air spring to relieve the excess pressure.

The lower or lesser bore 21 of the piston rod I is countersunk at its inner end to form a seat 22 to receive the flanged end of a bushing 23 which fits in the upper portion of said bore 21. The lower end of the bore of bushing 23 is contracted to form an air port 24 whose inner end is normally closed by a ball valve 25 held seated by a spring actuated plunger 26 mounted in the nipple 27. The nipple 27 fits in the bore of the bushing 23 and is held in place by means of a split spring ring 28 seated in an annular groove 29 in said bushing.

27ª represents vertical grooves in the perimeter of the nipple 27 to permit air to pass upwardly into the air-pumping chamber 4 when the valve 25 is open.

L is a cross head screwed in place in the interior of sleeve D and provided with a stuffing box through which the piston rod I extends. It is evident that the piston rod and the outer cylinder are thus maintained at all times in perfect alinement with the inner cylinder and the outer sleeves and that no pressure can escape through the open end of the sleeve D. The bore 21 of the piston rod I is enlarged at right angles to the frame A to provide a socket to receive the convex head of a block M, and at either side the wall of said piston rod is extended downwardly or outwardly to form a convexly curved bearing surface 30 which seats in a concaved bearing surface 31 on the block M.

32 is a heavy bolt or rivet which extends through registering holes in the walls of the piston rod I and the block M whereby said elements are attached together in such a manner as to permit a rocking, pivotal movement between them. The under or outer face of the block M is provided with a slide way 33 of dovetail cross section extending transversely of said block at right angles to its plane of movement. From said slideway 33 two diverging ports 34 communicate with grooves 35 in the walls of the piston rod I extending to the bore 21 of said piston rod, thereby assuring continuous communication between the piston rod bore and the slideway 33 whatever the relative positions of the piston rod I and the block M may be.

N is a hanger block provided at its top with a dovetail projection 36 which seats and slides in slideway 33.

37 are antifriction balls seated in raceways cut in the abutting faces of the blocks M and N to facilitate the sliding movement of the block N in relation to the block M. The block N is provided with a transverse bore 38 which is cut away or exposed for less than half its perimeter by means of an aperture 39 extending into the said bore from the front of the block N.

40 is the usual eye on the end of the leaf spring B which is slipped sidewise into the bore 38, the leaf spring extending out through the aperture 39. Large washers 41 are now applied to close the ends of the bore 38 and the bolt 42 inserted through said washers and the eye 40 of the leaf spring, and the nut 43 screwed tightly on the end of the bolt. It is evident that the eye is thus pivotally held in the bore 38. Preferably a bushing 44 is interposed between the eye 40 and the bolt 42 to give freer pivotal movement to the eye.

The front wall of the sleeve D is cut away for a distance from the bottom to form a slot 45 to give clearance for the protruding leaf spring B as the air spring contracts.

46 is an air port extending from the front of the hanger block N through the projection 36 and cut through to the top of said projection except at the front to maintain constant communication to atmosphere for the ports 34 in the block M. Thus at all times air is free to enter the bore 21 of the piston rod I.

47 is a screw plugged opening in the cap F by means of which compressed air may be introduced into the air spring to induce initial reciprocation. The interior of the air spring is preferably filled with a non-compressible liquid, such as the oil *a* up to substantially the top of the chamber 4. The operation of my improved air-spring is as follows: Assuming the proper initial pressure within the air-spring, the relief valve 19 is adjusted to automatically open at the proper cylinder pressure. Thus a heavily loaded vehicle will require a higher pressure in the air-springs to balance or cushion the load than will a lightly loaded vehicle, so that the excess pressure relief valve 19 should be adjusted to operate automatically whenever the internal pressure of the air-spring rises above that dictated by the load upon the air-spring. The vehicle is now put in motion, causing the air-spring to alternately contract and expand through the telescopic action of the cylinders G and H. The telescopic action between the said cylinders causes a similar reciprocation of the piston J in the air-pumping chamber 4. The descent of the piston J in said chamber holds the valve 25 closed while the compression of the air in said chamber below the descending piston forces open the valve 5, permitting the air to rush upwardly through the passeges 11 into the interior of the cylinder G above the liquid *a*. On the other hand, the return or upward movement of the piston J in the chamber 4 closes the valve 5 and sucks open the valve 25, causing air to be drawn up through the piston rod into the chamber 4, below the piston J, thus refilling said chamber.

It is evident that the continued reciprocation of the piston, as the air-spring alternately expands and contracts, will raise the internal pressure of the air-spring until such pressure, exerted on the upper side of the ball valve 5, is sufficient to hold said valve closed by balancing the effect of the load upon the air-spring. Thus no more air will be pumped into the interior of the air-spring unless the internal pressure of the same is lowered by leakage or the load is increased. In either case, the valve 5 will be forced open and the internal pressure of the air-spring will be restored or increased, as the case may be, to the proper degree to balance the load. Thus the proper balancing or cushioning pressure will be automatically established and maintained.

In case a sudden jolt or abnormal reciprocation of the telescopic parts of the air-spring unduly raises the internal pressure, the relief valve 19 will momentarily open to relieve said excess pressure and close, when said relief is accomplished, without lowering the pressure below the predetermined point.

The resilient connection between the piston J and the cap F, cushions the movement imparted to the piston and, in case an abnormal contraction of the air-spring causes the piston to descend to the bottom of the chamber 4, no sudden jar or jolt results. As the air-spring expands, the pressure exerted against the upper face of the piston and the resiliency of the spring K will cause the piston to lag slightly while the descent of the piston in compressing the air in chamber 4 will be accelerated by the pressure above the piston, causing the piston to travel more rapidly than the cylinder G thus augmenting the injection of air from the pumping chamber 4 into the cushion chamber proper. The liquid *a* tightly seals the sliding joints of the air-spring against loss of internal pressure and lubricates the moving parts.

It is evident that the telescopic parts of the air-spring are held in proper alinement by means of the sleeves C and D and the crosshead L, so that the reciprocal action is protected from impairment and the sliding joints maintain their efficiency. The method of attaching the cylinder H to the vehicle, such as the leaf-spring B, is such that all irregularities of movement which occur between the portions of the vehicle, such as the frame and the axle or leaf-spring, are taken up and assumed without the telescoping elements of the air-spring. Thus the pivotal connection between the hanger block N and the leaf-spring combined with the sliding movement of the block N in the block M enables the leaf-spring to expand and contract freely with the motion of the vehicle, while the pivotal connection between the block M and the piston rod H assumes the lateral sway and twist of the vehicle parts. Thus the telescopic parts are free to move without binding or interference of any kind.

What I desire to claim is:

1. In an air-spring, a pair of telescoping elements forming a cushion chamber, a pumping chamber within said cushion chamber and mounted on and moving with one of said telescopic elements, an inwardly opening valve connecting said pumping chamber to atmosphere, a pumping piston working in said pumping chamber and provided with a valve connecting said chambers, and a resilient mechanical connection between the second telescopic element and said pumping piston, for the purpose described.

2. In an air-spring, a pair of telescoping elements forming a cushion chamber, a pumping chamber within said cushion chamber mounted on and moving with one of said telescopic elements, an inwardly opening valve connecting said pumping chamber with atmosphere, a pumping piston working in said pumping chamber, a valve in said piston connecting said chambers, and a helical spring connecting said pumping piston with the other telescopic element whereby the same move in substantial unison, for the purpose described.

3. In an air-spring, a pair of telescoping elements forming a cushion chamber, a pumping chamber within said cushion chamber mounted on and moving with one of said telescopic elements and having a valved inlet port communicating with atmosphere, and a pumping piston working in said pumping chamber and having a resilient mechanical connection with the other telescopic element so as to move in substantial unison therewith, said pumping piston being provided with a valved air port constituting the outlet of said pumping chamber, for the purpose described.

4. The combination with a vehicle and a telescopic cushion device to be interposed between two portions of the vehicle and having one of its elements attached to one of said portions, of a member pivotally attached to the other element of said cushion device and swinging in a vertical plane transverse to the line of travel of the vehicle, and a sliding connection between said member and the other portion of said vehicle, the sliding motion being in the line of travel of the vehicle.

5. The combination with a load platform of a vehicle, of a leaf-spring carried by the running gear, a telescopic cushion device one element of which is secured to said load platform, a member pivoted to the other element of said cushion device, and a sliding connection between said member and said leaf spring.

6. The combination with the load platform of a vehicle, of a leaf spring carried by the running gear, a telescopic cushion device one element of which is secured to said load platform, a member pivoted to the other element of said cushion device and adapted to swing transversely to said leaf spring, and a sliding pivotal connection between said member and said leaf spring.

7. The combination with the load platform of a vehicle, of a leaf spring carried by the running gear, a telescopic cushion device one element of which is secured to said load platform, a member pivoted to the other element of said cushion device and adapted to swing transversely to said leaf spring, said member being provided with a slideway transverse to the direction of its pivotal swing, and a block mounted on said leaf spring and traveling along said slideway.

8. In combination with the piston rod of a telescopic cushion device, a mounting for said piston rod consisting of a member pivotally connected to the outer end of said rod and a slide mounted in said member transverse to the pivotal swing of the latter.

9. In combination with the piston rod of a telescopic cushion device and the spring of a vehicle, a mounting for said piston rod comprising a member pivoted to the outer end of said rod transversely to the spring, and a slide mounted in said member and attached to said spring.

10. In combination with the piston rod of a telescopic air spring, a mounting for said piston rod for attaching the same to a vehicle comprising a member pivoted to the outer end of said rod, and a slide mounted in said member and adapted to be attached to a portion of the vehicle, said rod, member and slide being provided with a continuous air passage from atmosphere to the interior of said air spring.

Signed at Pittsburgh, Penna., this 23rd day of December 1915.

JOHN G. FUNK.